United States Patent Office

3,293,268
Patented Dec. 20, 1966

3,293,268
PRODUCTION OF MALEIC ANHYDRIDE BY
OXIDATION OF n-BUTANE
Richard I. Bergman, Princeton, N.J., and Norman W. Frisch, Levittown, Pa., assignors to Princeton Chemical Research, Inc., Princeton, N.J., a corporation of New Jersey
No Drawing. Filed Mar. 23, 1964, Ser. No. 354,132
8 Claims. (Cl. 260—346.8)

This invention relates to a method for the preparation of maleic anhydride by the catalytic vapor phase oxidation of saturated aliphatic hydrocarbons, and more particularly to such a method for producing maleic anhydride in higher yields than heretofore possible.

In accordance with the present invention, various saturated aliphatic hydrocarbons having from 4 to 10 carbon atoms are oxidized to produce maleic anhydride. Since the highest yields of maleic anhydride may be produced by oxidation of n-butane, and since such material is readily available in good purity at a relatively low price, as compared with other saturated aliphatic hydrocarbons of the indicated class, it is preferred to employ n-butane for the practice of the method hereof. Accordingly, principal reference has been had, in the following specification, to the preparation of maleic anhydride by the oxidation of n-butane; it will be understood, however, as noted above, that the oxidation of other saturated aliphatic hydrocarbons having from 4 to 10 carbon atoms is within the scope of this invention.

Heretofore, maleic anhydride has been commercially produced by the catalytic, vapor phase oxidation of aromatic hydrocarbons such as benzene. More recently, several proposals have been made directed to catalytically oxidizing butene and other unsaturated aliphatic hydrocarbons to maleic anhydride, in the presence of phosphorus-vanadium-oxygen containing complex catalysts. According to one such proposal, disclosed in U.S. Patent No. 2,773,838, granted on December 11, 1956, the oxidation of unsaturated aliphatics to maleic anhydride and alkyl substituted maleic anhydrides may be carried out in the presence of a catalyst prepared by the reaction of phosphoric acid with ammonium meta-vanadate in aqueous solution, followed by drying and calcining the resulting reaction product.

According to another proposed technique, described in U.S. Patent No. 2,733,921, also granted on December 11, 1956, conversions of olefins may be catalyzed by another phosphorus - vanadium - oxygen containing complex catalyst, prepared by the reaction of anhydrous phosphoric acid with solid vanadium pentoxide.

In a still more recent disclosure, in U.S. Patent No. 3,031,508, granted on April 24, 1962, the oxidation of mono-olefins such as isobutylene to aldehydes is described, in the presence of a further phosphorus-vanadium-oxygen containing catalyst complex, prepared by reacting phosphoric acid with vanadium pentoxide in concentrated hydrochloric acid.

Finally, in copending application, Serial No. 354,164, entitled "Production of Aliphatic Dicarboxylic Acid Anhydrides," filed concurrently herewith, we have described the use of another phosphorus-vanadium-oxygen containing complex catalyst, prepared by reacting phosphoric acid with vanadium oxalate, for the catalytic oxidation of various unsaturated aliphatic hydrocarbons to the corresponding dicarboxylic acid anhydrides.

Heretofore, these and other oxidation catalysts have not generally been employed in the oxidation of n-butane or other saturated aliphatic hydrocarbons to maleic anhydride, as a result of the relatively poor yields of maleic anhydride produced therewith. Prior disclosures relating to the oxidation of n-butane and the like have rather been principally directed to thermal oxidation techniques, which are non-selective and which may produce mixtures containing, for example, formaldehyde, acetaldehyde, acetone, methanol, propanol, butanol and various organic acids. See, for example, Fuson, Advanced Organic Chemistry, Wiley, New York, 1950, p. 251. One exception to this rule is the catalytic procedure described in U.S. Patent Nos. 2,625,519 and 2,691,660. These patents describe oxidizing n-butane to maleic anhydride in the presence of a precipitated oxide catalyst comprising molybdenum oxide combined with either cobalt oxide or nickel oxide. However, such catalytic oxidation only produces yields of maleic anhydride of from about 0.5 to 16 weight percent, employing fixed catalyst beds. Due to the relatively poor yields of maleic anhydride thus obtained, the procedure described in the aforesaid patents has never achieved commercial status.

It is accordingly among the objects of the present invention to provide a catalytic method for oxidizing saturated aliphatic hydrocarbons such as n-butane to maleic anhydride.

A further object of the invention is to provide such a method employing a phophorus-vanadium-oxygen containing complex catalyst, which provides yields of maleic anhydride which are substantially higher than those heretofore obtained by the oxidation of saturated aliphatic hydrocarbons.

These and other objects of the present invention will be more fully apparent from a consideration of the following detailed description of preferred embodiments thereof.

The objects of the invention are achieved by oxidizing n-butane or other saturated aliphatic hydrocarbon having from 4 to 10 carbon atoms under controlled temperature conditions and in the presence of a specified class of phosphorus-vanadium-oxygen containing complex catalysts having particular phosphorus-vanadium-constituent proportions, depending upon the specific catalyst complex utilized. Specifically, the invention involves oxidizing the saturated aliphatic hydrocarbon at temperatures of from about 500° to 600° C., in the presence of either (a) a catalyst prepared by reacting phosphoric acid with vanadium oxalate and heating the reaction product at temperatures of from about 300° to 500° C., the resulting catalytic material having a P/V ratio (the ratio of the number of gram atoms of phosphorus per gram atom of vanadium present in the catalyst) of from about 1:1 to 3:1; (b) a catalyst prepared by reacting phosphoric acid with ammonium meta-vanadate, and heating the reaction product at temperatures of from about 300° C. to 500° C., the catalytic material having a P/V ratio of from about 1.8:1 to 2.2:1; or (c) a catalyst prepared by reacting either phosphoric acid or phosphorus pentoxide with a vanadium oxysalt, and heating the reaction product at temperatures of from 300° to 500° C., the catalytic material having a P/V ratio of from about 1.02:1 to 1.5:1.

Surprisingly when, for example, n-butane is oxidized under the indicated temperature conditions and in the presence of one of the indicated phosphorus-vanadium-oxygen containing complex catalysts having the specified P/V ratios, higher yields of maleic anhydride are produced than was heretofore possible. It has in fact been found that the use of phosphorus-vanadium-oxygen complex catalysts having the indicated P/V ratios produces yields of maleic anhydride of up to about 50 weight percent, employing fixed bed reaction systems, whereas the use of such catalysts having P/V ratios outside the indicated ranges provides only negligible yields of maleic anhydride.

The catalysts employed in the present method are prepared by reacting the specified materials in aqueous solutions, drying the reaction products by evaporation of the supernatant liquids therefrom, and thereafter heating the solid reaction products at temperatures of from about 300° to 500° C., to produce the catalytically active materials.

The catalyst prepared by reaction of phosphoric acid and vanadium oxalate is produced in the manner more fully described in our aforesaid copending application, Serial No. 354,164, by initially dissolving vanadium pentoxide in an aqueous solution of oxalic acid to form vanadium oxalate, and subsequently adding phosphoric acid thereto in the proportion of from about 2 to 6, preferably from about 3.6 to 4.4, moles of the phosphoric acid per mole of the vanadium pentoxide thus added. The solution is thereafter heated to dryness and the remaining solid reaction product heated at temperatures of from about 300° to 500° C. for a period of from about 1 to 4 hours, to produce the catalyst. By employing the indicated proportions of phosphoric acid and vanadium oxalate a catalytic material is provided having a P/V atom ratio of between about 1:1 and 3:1, desirably between 1.8:1 and 2.2:1.

The catalyst prepared by reaction of phosphoric acid with ammonium meta-vanadate is prepared by initially dissolving ammonium meta-vanadate in an aqueous phosphoric acid solution in an amount such that the reaction mixture contains from about 1.8 to 2.2 moles of the phosphoric acid per mole of the ammonium meta-vanadate. The reaction mixture is heated to evaporate the supernatant liquid therefrom, and the remaining solid reaction product is heated, in the manner specified above, to produce the active catalyst material. By employing the indicated proportions of phosphoric acid and ammonium meta-vanadate the catalytic material produced has a P/V atom ratio of between 1.8:1 and 2.2:1.

The catalyst prepared by reacting either phosphoric acid or phosphorus pentoxide with a vanadium oxysalt is produced by dissolving vanadium pentoxide and the phosphorus containing reactant in a concentrated aqueous solution of a hydrogen halide, preferably hydrochloric acid but alternatively hydrogen iodide or hydrogen bromide. The phosphorus containing reactant, preferably concentrated phosphoric acid, and the vanadium pentoxide are thus reacted in the proportion of from about 1.02 to 1.5 moles of the acid per mole of the vanadium oxyhalide formed in the solution, in order that the catalytically active product formed by reaction thereof has a P/V atom ratio of between about 1.02:1 and 1.5:1, in accordance with the present invention.

The thus prepared catalyst materials are thereafter ground and pelleted to the sizes desired. Such catalysts may be employed for either fixed or fluidized bed operations. When utilized for fixed catalyst beds, pellet sizes of from about 1/16 to 1/2 inch diameter are desirably utilized, whereas for fluidized bed operations smaller particle sizes are desirable.

In accordance with a further feature of the present invention, the high yields of maleic anhydride produced by use of the unsupported phosphorus-vanadium-oxygen containing complex catalysts prepared as described above, may be maintained when such catalysts are blended after preparation with an inert carrier such as alpha alumina, silicon carbide or a similar support material which is substantially free of active metal such as iron. We have found that when the complex catalysts hereof are supported during the process of preparation thereof they produce substantially lower yields of maleic anhydride as compared with the corresponding unsupported material. On the other hand, if the support materials are blended with the catalysts after their formation, surprisingly high product yields may be maintained.

The phosphorus-vanadium-oxygen containing complex catalysts having the specific P/V ratios indicated, whether free of carrier or supported in the manner indicated, are employed to catalyze the vapor phase oxidation of n-butane or other saturated aliphatic hydrocarbon having from 4 to 10 carbon atoms. The n-butane, for example, is oxidized by admixing the same with any suitable free oxygen containing gas, such as air or a mixture of oxygen with inert gases, and the resulting mixture passed over one of the phosphorus-vanadium-oxygen complex catalysts, prepared as aforesaid.

The oxidation reaction takes place at temperatures of from about 500° to 600° C., preferably from about 525° to 575° C., under pressures ranging from about 0.5 to 20 atmospheres, desirably about 1–6 atmospheres. In the case of n-butane, optimum yields of maleic anhydride are produced when the n-butane is admixed with air in the proportion of from about 0.5 to 3 volume percent of the air stream, and passed over one of the indicated catalysts while maintaining a contact time of from about 0.05 to 5 seconds.

It has further been found that, when the n-butane is admixed with the free oxygen containing gas, which may also contain nitrogen, carbon dioxide or other inerts, in the presence of from about 3 to 50 moles of steam per mole of the n-butane, substantially greater yields of the maleic anhydride are produced. In fact, the yield of maleic anhydride may, thus, be increased by about 10% by weight, as compared with yields produced by comparable reactions conducted in the absence of such additive.

Since the oxidation of n-butane or other saturated aliphatic hydrocarbons within the scope of the present invention is exothermic, it may be necessary to remove the heat of reaction in order to maintain the reaction temperature in the preferred range of from about 500° to 600° C. Hence, while adiabatic operations are feasible when low vapor throughputs are employed, it is preferable to utilize a circulating heat transfer fluid, such as a eutectic salt mixture, to assure maintaining the temperature of the reaction medium within the desired range.

The following examples illustrate preferred embodiments of the catalytic method for oxidizing saturated aliphatic hydrocarbons of the present invention. In each of the examples, percentage yields are given on the basis of the number of pounds of maleic anhydride produced per pound of n-butane feed.

EXAMPLE 1

A phosphorus-vanadium-oxygen containing catalyst having a P/V ratio of 1.75:1 was prepared by dissolving 234 grams of oxalic acid dihydrate in 400 ml. of water, then dissolving 80.6 grams of vanadium pentoxide in the solution and adding 177.3 grams of 85.7% phosphoric acid ($H_3PO_4$) with stirring. The solution was thereafter heated to dryness and then at a temperature of 450° C. for a period of 2 hours. During the heating period, evolution of oxalate decomposition products was noted.

The resulting catalyst was ground to pass a 20 mesh screen and pelleted to a 3/16 inch average diameter.

60 grams of the catalyst thus prepared were charged to a fixed catalyst bed in a test reactor defined by a three-foot long stainless steel tube having a 3/4 inch internal diameter, and containing an axial thermocouple to measure temperature, a two foot portion of which tube was enclosed by a brass block.

The catalyst was charged to the reactor at room temperature and the reactor heated for a period of 16 hours at 400° C. n-Butane was thereafter passed through the reactor in 0.5 volume percent concentration in air, the mixture being fed through the catalyst bed at a rate sufficient to maintain a catalyst contact time of about 0.4 second.

Maleic anhydride product was recovered by water scrubbing the tail gases, followed by distillation and dehydration. In successive runs conducted at varying temperatures, the following yields of maleic anhydride were obtained:

Table 1

| Reaction temperature, ° C. | Percent yield maleic anhydride |
|---|---|
| 450 | 8 |
| 500 | 14 |
| 550 | 33 |
| 575 | 35 |

Additional catalysts prepared as described above and having P/V ratios of 1.02:1 and 2.5:1 provided yields of about 25% (at 550° C.) and 26% (at 575° C.), respectively, of maleic anhydride when reacted in the manner described above.

EXAMPLE 2

Further phosphorus-vanadium-oxygen complex catalysts having varying P/V ratios were prepared by dissolving vanadium pentoxide in 12 N HCl with stirring, and adding appropriate portions of 85.7% phosphoric acid thereto. In the case of a catalyst having a P/V ratio of 1.15:1, 134.4 grams of the vanadium pentoxide was dissolved in 1750 ml. of 12 N HCl and 194.5 grams of the phosphoric acid added thereto.

The reaction mixtures thus produced were heated to dryness and then at a temperature of 365° C. for a period of 2–4 hours. Each such catalyst was ground to pass a 20 mesh screen and pelleted to a diameter of 3/16″ employing 2 weight percent graphite as a pelletizing lubricant.

100 grams of each such catalyst composition were charged to the oxidation reactor and n-butane passed therethrough, as described in Example 1. The product was recovered by direct condensation from the reactor tail gas. The yields of maleic anhydride produced using each catalyst, while maintaining a catalyst contact time of 0.4 second and reaction temperatures in the range of from 450° to 625° C., were then determined; the results obtained are indicated in the following tabulation:

Table 2
PERCENT YIELD MALEIC ANHYDRIDE FOR VARIOUS CATALYST P/V RATIOS AND REACTION TEMPERATURES

| P/V Ratio | Reaction Temperatures | | | | | |
|---|---|---|---|---|---|---|
| | 450° C. | 525° C. | 550° C. | 575° C. | 600° C. | 625° C. |
| 1.00 | 10 | 25 | 29 | 34 | 24 | |
| 1.025 | 16 | 33 | [1] 40 | 39 | | |
| 1.05 | | 48 | [1] 52 | 47 | | |
| 1.075 | | 33 | 40 | 39 | | |
| 1.15 | | 35 | [1] 40 | 39 | | |
| 1.50 | 11 | 34 | 42 | 42 | | 15 |
| 2.00 | | | 0 | | | |

[1] Percent.

From the data set forth in Table 2, it will be noted that yields of maleic anhydride in excess of 35% are only obtained within the indicated temperature range, and when a phosphorous-vanadium-oxygen complex catalyst having a P/V ratio of between about 1.02:1 and 1.5:1 is employed.

EXAMPLE 3

Further phosphorus-vanadium-oxygen complex catalyst having varying P/V ratios were prepared by dissolving amounts of ammonium meta-vanadate in an aqueous solution containing phosphoric acid, evaporating the resulting reaction mixtures to dryness and heating the same at temperatures of up to 500° C. for a period of 2–4 hours. In the case of the catalyst having a P/V ratio of 2.0, 103.5 grams of the ammonium meta-vanadate were dissolved in 350 ml. of water containing 201.2 grams of phosphoric acid, and the mixture heated as aforesaid.

The dry catalytic materials were ground to pass through a 20 mesh screen and pelleted to average diameters of 3/16″. Thereafter 100 grams of each such catalyst were charged to the oxidation reactor described in Example 1 and n-butane passed therethrough as described in Example 1.

The yields of maleic anhydride produced using each such catalyst over a range of oxidation temperatures was then determined; the data obtained is indicated below:

Table 3
PERCENT YIELD MALEIC ANHYDRIDE FOR VARIOUS CATALYST P/V RATIOS AND REACTION TEMPERATURES

| P/V Ratio | Reaction Temperature | | |
|---|---|---|---|
| | 500° C. | 550° C. | 600° C. |
| 1.00 | | 22 | |
| 1.80 | | 34 | |
| 2.00 | 21 | 46 | [1] 48 |
| 2.20 | 20 | 35 | 33 |
| 2.50 | | 20 | 24 |

[1] Percent.

EXAMPLE 4

50 grams of the catalyst prepared in Example 3, having a P/V ratio of 2.0, were blended with 50 grams of ground alpha alumina. The mixture was thereafter ground and pelleted to an average 3/16″ diameter.

Upon charging the thus supported catalyst to the oxidation reactor and passing n-butane over the catalyst in the manner described in Example 1 while maintaining a reaction temperature of 600° C., it was found that a 33 weight percent yield of maleic anhydride was produced.

For comparison, alpha-alumina pellets were added to the reaction mixture utilized to produce the indicated catalyst material. The mixture was then heated to evaporate the supernatant liquid, and then at a temperature of 350° C. for a period of 2½ hours. When the thus supported catalyst was charged to the oxidation reactor and n-butane fed therethrough in the manner described above, only a 20% yield of maleic anhydride was produced.

Hence, it will be seen that use of the complex catalysts hereof, when blended after formation with an alpha-alumina support, provides yields of maleic anhydride substantially equal to those effected employing the unsupported catalysts, which yield is markedly greater than that produced employing the corresponding complex catalyst produced by simultaneous reaction of the complex forming reactants with the carrier material therefor. Blending silicon carbide with the catalyst in the manner described above produced similar results.

EXAMPLE 5

100 grams of the catalyst prepared as described in Example 2, having a P/V ratio of 1.05, was employed to catalyze the oxidation of n-butane in an air stream containing 0.5 volume percent of the n-butane and 5 volume percent steam (10 moles of steam per mole of n-butane). It was found that the yield of maleic anhydride increased an average of 5–10% as compared with the yield produced by oxidation of the n-butane-air stream in the presence of the same catalyst, but without the addition of the indicated proportions of steam to the gaseous reaction mixture.

It will be understood that, since various changes can be made in the embodiments of the method for preparing maleic anhydride described hereinabove, without departing from the scope of the present invention, the preceding description should be interpreted as illustrative and not in a limiting sense.

We claim:
1. A method for the preparation of maleic anhydride, which comprises oxidizing a reactant consisting essentially of a saturated aliphatic hydrocarbon having from 4 to 10 carbon atoms, at temperatures of from 500° to 600° C., in the presence of a phosphorus-vanadium-oxygen-containing complex catalyst selected from the group consisting of:
   (a) a catalyst prepared by reacting phosphoric acid with vanadium oxalate in aqueous solution, and drying and heating the reaction product at temperatures of from 300° to 500° C., the resulting material containing from 1.0 to 3.0 gram atoms of phosphorus per gram atom of vanadium present therein;
   (b) a catalyst prepared by reacting phosphoric acid with ammonium meta-vanadate in aqueous solution, and drying and heating the reaction product at temperatures of from 300° to 500° C., the resulting material containing from 1.8 to 2.2 gram atoms of phosphorus per gram atom of vanadium present therein; and
   (c) a catalyst prepared by reacting a phosphorus compound selected from the group consisting of phosphoric acid and $P_2O_5$ with a vanadium compound in an aqueous solution of a hydrogen halide, and drying and heating the reaction product at temperatures of from 300° to 500° C., the resulting material containing from 1.02 to 1.5 gram atoms of phosphorus per gram atom of vanadium present therein.

2. The method as defined in claim 1, in which said phosphorus-vanadium-oxygen-containing complex catalyst is catalyst (c), and in which the vanadium compound utilized to prepare such catalyst is formed by dissolving vanadium pentoxide and phosphoric acid or phosphorus pentoxide in an aqueous solution of a hydrogen halide.

3. The method as defined in claim 1, in which said phosphorus-vanadium-oxygen containing complex catalyst is substantially free of inert carrier particles.

4. The method as defined in claim 1, in which said phosphorus-vanadium-oxygen containing complex catalyst is admixed, after formation, with an inert carrier and in which said saturated aliphatic hydrocarbon is oxidized in the presence of the resulting mixture.

5. The method as defined in claim 1, in which said saturated aliphatic hydrocarbon is oxidized in a vapor phase mixture containing oxygen and from 3 to 50 moles of steam per mole of said hydrocarbon.

6. A method for preparing maleic anhydride, which comprises mixing n-butane and a free oxygen containing gas at temperatures of from 525° to 575° C., in the presence of a phosphorus-vanadium-oxygen containing complex catalyst prepared by reacting phosphoric acid with vanadium oxalate in aqueous solution in the proportion of from 3.6 to 4.4 moles of the acid per mole of vanadium pentoxide added, drying the reaction product by evaporation of the supernatant liquid therefrom, and heating such product at temperatures of from 300° to 500° C., the catalyst thus prepared containing from 1.8 to 2.2 gram atoms of phosphorus per gram atom of vanadium present therein.

7. A method for preparing maleic anhydride, which comprises mixing n-butane and a free oxygen containing gas at temperatures of from 525° to 575° C., in the presence of a phosphorus-vanadium-oxygen containing complex catalyst prepared by reacting phosphoric acid with ammonium meta-vanadate in aqueous solution in the proportion of from 1.8 to 2.2 moles of the acid per mole of ammonium meta-vanadate, drying the reaction product by evaporation of the supernatant liquid therefrom, and heating the solid product at temperatures of from 300° to 500° C., the catalyst thus prepared containing from 1.8 to 2.2 gram atoms of phosphorus per gram atom of vanadium present therein.

8. A method for preparing maleic anhydride, which comprises mixing n-butane and a free oxygen containing gas at temperatures of from 525° to 575° C., in the presence of a phosphorus-vanadium-oxygen containing complex catalyst prepared by reacting phosphoric acid with vanadium pentoxide in an aqueous hydrochloric acid solution in the proportion of from 2.04 to 3.0 moles of the acid per mole of vanadium pentoxide present therein, drying the reaction product by evaporating the supernatant liquid therefrom, and heating the same at temperatures of from 300° to 500° C., the catalyst thus prepared containing from 1.02 to 1.5 gram atoms of phosphorus per gram atom of vanadium present therein.

References Cited by the Examiner
UNITED STATES PATENTS

| | | | |
|---|---|---|---|
| 2,773,838 | 12/1956 | Reid et al. | 260—346.8 |
| 2,773,921 | 12/1956 | Rylander et al. | 260—346.8 |
| 3,106,569 | 10/1962 | Robinson | 260—346.8 |

NICHOLAS S. RIZZO, *Primary Examiner.*